United States Patent
Mandegaran

(10) Patent No.: US 10,038,458 B2
(45) Date of Patent: Jul. 31, 2018

(54) REFLECTION-BASED RADIO-FREQUENCY MULTIPLEXERS

(71) Applicant: Abtum Inc., Irvine, CA (US)

(72) Inventor: Sam Mandegaran, Pasadena, CA (US)

(73) Assignee: ABTUM INC., Irvine, CA (US)

( * ) Notice: Subject to any disclaimer, the term of this patent is extended or adjusted under 35 U.S.C. 154(b) by 194 days.

(21) Appl. No.: 15/280,571

(22) Filed: Sep. 29, 2016

(65) Prior Publication Data

US 2017/0099652 A1   Apr. 6, 2017

Related U.S. Application Data

(60) Provisional application No. 62/237,891, filed on Oct. 6, 2015.

(51) Int. Cl.
- *H04W 4/00* (2018.01)
- *H04B 1/00* (2006.01)
- *H04W 72/04* (2009.01)

(52) U.S. Cl.
CPC .......... *H04B 1/005* (2013.01); *H04B 1/0057* (2013.01); *H04W 72/0453* (2013.01)

(58) Field of Classification Search
None
See application file for complete search history.

(56) References Cited

U.S. PATENT DOCUMENTS

| | | |
|---|---|---|
| 2,561,212 A | 7/1951 | Lewis |
| 3,025,463 A | 3/1962 | Luoma et al. |
| 3,453,638 A | 7/1969 | Hoovier |
| 3,704,409 A | 11/1972 | Oomen |
| 3,800,218 A | 3/1974 | Shekel |
| 4,029,902 A | 6/1977 | Bell et al. |
| 4,146,851 A | 3/1979 | Dempsey et al. |

(Continued)

FOREIGN PATENT DOCUMENTS

| | | |
|---|---|---|
| DE | 102012107877 A1 | 2/2014 |
| EP | 1091497 A1 | 4/2001 |

(Continued)

OTHER PUBLICATIONS

EESR for European Appl. No. 13876497.2, dated Jul. 4, 2016.

(Continued)

*Primary Examiner* — Rebecca E Song
(74) *Attorney, Agent, or Firm* — McAndrews, Held & Malloy, Ltd.

(57) ABSTRACT

A radio frequency multiplexer, which supports a plurality of frequency bands, comprises a common node, a plurality of single band nodes, and a plurality of parallel branches. Each of the plurality of parallel branches is designated to one of the plurality of frequency bands and connects the common node and one of the plurality of single band nodes. A particular branch of the parallel branches may comprises a filter for a desired frequency band that passes through the particular branch, a quadrature hybrid coupler coupled to the filter, and a set of one or more other filters for one or more other frequency bands in the plurality of frequency bands respectively. The set of one or more other filters is coupled to the quadrature hybrid coupler for rejecting the one or more other frequency bands by the particular branch.

20 Claims, 8 Drawing Sheets

(56) References Cited

U.S. PATENT DOCUMENTS

| | | |
|---|---|---|
| 4,427,936 A | 1/1984 | Riblet et al. |
| 4,464,675 A | 8/1984 | Balaban et al. |
| 4,489,271 A | 12/1984 | Riblet |
| 4,694,266 A | 9/1987 | Wright |
| 4,721,901 A | 1/1988 | Ashley |
| 4,963,945 A | 10/1990 | Cooper et al. |
| 4,964,945 A | 10/1990 | Cooper et al. |
| 4,968,967 A | 11/1990 | Stove |
| 5,408,690 A | 4/1995 | Ishikawa et al. |
| 5,483,248 A | 1/1996 | Milroy |
| 5,493,246 A | 2/1996 | Anderson |
| 5,525,945 A | 6/1996 | Chiappetta et al. |
| 5,574,400 A | 11/1996 | Fukuchi |
| 5,691,978 A | 11/1997 | Kenworthy |
| 5,781,084 A | 7/1998 | Rhodes |
| 6,178,310 B1 | 1/2001 | Jeong |
| 6,194,980 B1 | 2/2001 | Thon |
| 6,229,992 B1 | 5/2001 | McGeehan et al. |
| 6,262,637 B1 | 7/2001 | Bradley et al. |
| 6,297,711 B1 | 10/2001 | Seward et al. |
| 6,496,061 B1 | 12/2002 | Bloom |
| 6,721,544 B1 | 4/2004 | Franca-Neto |
| 6,819,302 B2 | 11/2004 | Volman |
| 6,946,847 B2 | 9/2005 | Nishimori et al. |
| 7,072,614 B1 | 7/2006 | Kasperkovitz |
| 7,116,966 B2 | 10/2006 | Hattori et al. |
| 7,123,883 B2 | 10/2006 | Mages |
| 7,250,830 B2 | 7/2007 | Layne et al. |
| 7,283,793 B1 | 10/2007 | McKay |
| 7,330,500 B2 | 2/2008 | Kouki |
| 7,369,811 B2 | 5/2008 | Bellatoni et al. |
| 7,623,005 B2 | 11/2009 | Johansson et al. |
| 7,633,435 B2 | 12/2009 | Meharry et al. |
| 7,636,388 B2 | 12/2009 | Wang et al. |
| 7,711,329 B2 | 5/2010 | Aparin et al. |
| 7,804,383 B2 | 9/2010 | Volatier et al. |
| 7,894,779 B2 | 2/2011 | Meiyappan et al. |
| 8,013,690 B2 | 9/2011 | Miyashiro |
| 8,135,348 B2 | 3/2012 | Aparin |
| 8,149,742 B1 | 4/2012 | Sorsby |
| 8,199,681 B2 | 6/2012 | Zinser et al. |
| 8,385,871 B2 | 2/2013 | Wyville |
| 8,422,412 B2 | 4/2013 | Hahn |
| 8,514,035 B2 | 8/2013 | Mikhemar et al. |
| 8,600,329 B1 | 12/2013 | Comeau et al. |
| 8,620,246 B2 | 12/2013 | McKinzie et al. |
| 8,749,321 B2 | 6/2014 | Kim et al. |
| 8,761,026 B1 | 6/2014 | Berry et al. |
| 8,942,657 B2 | 1/2015 | McKinzie, III et al. |
| 8,957,742 B2 | 2/2015 | Spears et al. |
| 9,048,805 B2 | 6/2015 | Granger et al. |
| 9,214,718 B2 | 12/2015 | Mow et al. |
| 9,450,553 B2 | 9/2016 | Langer et al. |
| 9,479,214 B2 | 10/2016 | Webb et al. |
| 9,490,866 B2 | 11/2016 | Goel et al. |
| 9,500,727 B2 | 11/2016 | Sohn et al. |
| 9,543,630 B2 | 1/2017 | Tokumitsu et al. |
| 9,590,794 B2 | 3/2017 | Behnam et al. |
| 2002/0089396 A1 | 7/2002 | Noguchi et al. |
| 2003/0109077 A1 | 6/2003 | Kim et al. |
| 2004/0000425 A1 | 1/2004 | White et al. |
| 2004/0127178 A1 | 7/2004 | Kuffner |
| 2004/0180633 A1 | 9/2004 | Nakatani et al. |
| 2005/0070232 A1 | 3/2005 | Mages |
| 2005/0245213 A1 | 11/2005 | Hirano et al. |
| 2005/0289632 A1 | 12/2005 | Brooks |
| 2006/0019611 A1 | 1/2006 | Mages |
| 2007/0105509 A1 | 5/2007 | Muhammad |
| 2008/0128901 A1 | 6/2008 | Zurcher et al. |
| 2008/0227409 A1 | 9/2008 | Chang |
| 2008/0240000 A1 | 10/2008 | Kidd |
| 2008/0261519 A1 | 10/2008 | Demarco et al. |
| 2009/0054008 A1 | 2/2009 | Satou |
| 2009/0121797 A1 | 5/2009 | Karabatsos |
| 2009/0125253 A1 | 5/2009 | Blair et al. |
| 2009/0252252 A1 | 10/2009 | Kim et al. |
| 2009/0253385 A1 | 10/2009 | Dent et al. |
| 2009/0289744 A1 | 11/2009 | Miyashiro |
| 2010/0002620 A1 | 1/2010 | Proctor et al. |
| 2010/0084146 A1 | 4/2010 | Roberts |
| 2010/0109771 A1 | 5/2010 | Baik et al. |
| 2010/0127795 A1 | 5/2010 | Bauer et al. |
| 2010/0134700 A1 | 6/2010 | Robert et al. |
| 2020/0148886 | 6/2010 | Inoue et al. |
| 2010/0177917 A1 | 7/2010 | Van Der Werf |
| 2010/0323654 A1 | 12/2010 | Judson et al. |
| 2011/0069644 A1* | 3/2011 | Kim ............ H04B 1/0057 370/278 |
| 2011/0080229 A1 | 4/2011 | Kennington |
| 2011/0080856 A1 | 4/2011 | Kenington |
| 2011/0134810 A1 | 6/2011 | Yamamoto et al. |
| 2011/0140803 A1 | 6/2011 | Kim et al. |
| 2011/0227664 A1 | 9/2011 | Wyville |
| 2011/0256857 A1 | 10/2011 | Chen et al. |
| 2012/0007605 A1 | 1/2012 | Benedikt |
| 2012/0063496 A1 | 3/2012 | Giannini et al. |
| 2012/0075069 A1 | 3/2012 | Dickey et al. |
| 2012/0140860 A1 | 6/2012 | Rimini et al. |
| 2012/0154071 A1 | 6/2012 | Bradley et al. |
| 2012/0161784 A1 | 6/2012 | Benedikt |
| 2012/0163245 A1 | 6/2012 | Tone et al. |
| 2012/0194269 A1 | 8/2012 | Schlager |
| 2012/0201153 A1 | 8/2012 | Bharadia et al. |
| 2012/0201173 A1 | 8/2012 | Jain et al. |
| 2012/0212304 A1 | 8/2012 | Zhang et al. |
| 2012/0230227 A1 | 9/2012 | Weiss |
| 2013/0016634 A1 | 1/2013 | Smiley |
| 2013/0063299 A1 | 3/2013 | Proudkii |
| 2013/0065542 A1 | 3/2013 | Proudkii |
| 2013/0079641 A1 | 3/2013 | Zwirn |
| 2013/0083703 A1 | 4/2013 | Granger-Jones et al. |
| 2013/0109330 A1 | 5/2013 | Sahota et al. |
| 2013/0113576 A1 | 5/2013 | Inoue et al. |
| 2013/0130619 A1 | 5/2013 | Harverson et al. |
| 2013/0154887 A1 | 6/2013 | Hein et al. |
| 2013/0201880 A1 | 8/2013 | Bauder et al. |
| 2013/0201881 A1 | 8/2013 | Bauder et al. |
| 2013/0201882 A1 | 8/2013 | Bauder et al. |
| 2013/0222059 A1 | 8/2013 | Kilambi et al. |
| 2013/0241655 A1 | 9/2013 | Liss et al. |
| 2013/0241669 A1 | 9/2013 | Mikhemar et al. |
| 2013/0242809 A1 | 9/2013 | Tone et al. |
| 2013/0245976 A1 | 9/2013 | Hind |
| 2013/0301488 A1 | 11/2013 | Hong et al. |
| 2013/0321097 A1 | 12/2013 | Khlat et al. |
| 2014/0103946 A1 | 4/2014 | Vanden Bossche |
| 2014/0169236 A1 | 6/2014 | Choi et al. |
| 2014/0194073 A1 | 7/2014 | Wyville et al. |
| 2014/0204808 A1 | 7/2014 | Choi et al. |
| 2014/0348018 A1 | 11/2014 | Bharadia et al. |
| 2014/0376419 A1 | 12/2014 | Goel et al. |
| 2015/0049841 A1 | 2/2015 | Laporte et al. |
| 2015/0118978 A1 | 4/2015 | Khlat |
| 2015/0163044 A1 | 6/2015 | Analui et al. |
| 2015/0236390 A1* | 8/2015 | Analui ............ H04B 1/123 375/219 |
| 2015/0236395 A1 | 8/2015 | Analui et al. |
| 2015/0236842 A1 | 8/2015 | Goel et al. |
| 2016/0050031 A1 | 2/2016 | Hwang et al. |
| 2016/0134325 A1 | 5/2016 | Tageman et al. |
| 2016/0204821 A1 | 7/2016 | Han et al. |
| 2016/0211870 A1 | 7/2016 | Inu et al. |
| 2016/0380706 A1 | 12/2016 | Tanzi et al. |
| 2017/0030339 A1 | 2/2017 | Proudfoot |
| 2017/0070368 A1 | 3/2017 | Mandegaran |
| 2017/0214417 A1* | 7/2017 | Jian ............ H04B 1/0057 |

FOREIGN PATENT DOCUMENTS

| | | |
|---|---|---|
| EP | 2733855 A1 | 5/2014 |
| EP | 2814172 A1 | 12/2014 |
| EP | 2960981 A1 | 12/2015 |
| KR | 10-2010-0134324 A | 12/2010 |
| WO | 9515018 A1 | 6/1995 |

(56) References Cited

FOREIGN PATENT DOCUMENTS

| WO | 2014032883 A1 | 3/2014 |
|---|---|---|
| WO | 2014133625 A2 | 9/2014 |
| WO | 2015089091 A1 | 6/2015 |
| WO | 2016063108 A1 | 4/2016 |

OTHER PUBLICATIONS

Office Action for U.S. Appl. No. 14/626,572, dated Jul. 15, 2016.
Office Action for U.S. Appl. No. 14/622,627, dated May 20, 2016.
Office Action for U.S. Appl. No. 14/626,572, dated Mar. 31, 2016.
ISR for Application No. PCT/US2016/050466, dated Nov. 29, 2016.
Office Action for U.S. Appl. No. 14/626,572, dated Jul. 29, 2015.
ISR and Written Opinion for PCT Application No. PCT/US2015/016642, dated Jun. 25, 2015.
Hunter et al., "Passive Microwave Receive Filter Networks Using Low-Q Resonators," IEEE Microwave Magazine, pp. 46-53, (2005).
Laforge et al., "Diplexer design implementing highly miniaturized multilayer superconducting hybrids and filters," IEEE Transactions on Applied Superonductivity, pp. 47-54, (2009).
Marcatili et al., "Band-Splitting Filter," Bell System Technical Journal, pp. 197-212, (1961).
Matthaei et al., "Microwave Filters, Impedance-Matching Networks, and Coupling Structures," Chapter 14: Directional, Channel-Separation Filters and Traveling-WAve Ring-Resonators, pp. 843-887, Copyright 1980 Artech House, Inc., Dedham, MA; reprint of edition published by McGraw-Hill Book Company, 1964.
Matthaei et al., "Microwave Filters, Impedance-Matching Networks, and Coupling Structures," Chapter 16: Multiplexer Design, pp. 965-1000, Copyright 1980 Artech House, Inc., Dedham, MA; reprint of edition published by McGraw-Hill Book Company, 1964.
Phudpong et al., "Nonlinear Matched Reflection Mode and stop Filters for Frequency Selective Limiting Applications," Microwave Symposium Conference, IEEE/MTT-S International, pp. 1043-1046, (2007).
ISR and Written Opinion for PCT/US2014/069372, dated Mar. 3, 2015.
ISR and Written Opinion for PCT/US2015/016145, dated May 20, 2015.
ISR and Written Opinion for PCT/US2015/015930, dated May 27, 2015.
Korean International Searching Authority, ISR and Written Opinion for PCT/US2013/074155, dated Sep. 23, 2014.
Kannangara et al., "Analysis of an Adaptive Wideband Duplexer With Double-Loop Cancellation," IEEE Transactions on Vehicular Technology, vol. 56, No. 4, pp. 1761-1982, (2007).
Notice of Allowance for U.S. Appl. No. 14/102,244, dated Jul. 20, 2016.
Office Action for U.S. Appl. No. 14/102,244, dated Sep. 22, 2015.
Office Action for U.S. Appl. No. 14/102,244, dated Jun. 15, 2015.
ISR and Written Opinion for PCT/2016/054646, dated Dec. 29, 2016.

* cited by examiner

REFLECTION-BASED RADIO-FREQUENCY MULTIPLEXERS

CROSS-REFERENCE TO RELATED APPLICATIONS/INCORPORATION BY REFERENCE

This patent application makes reference to, claims priority to, and claims benefit from U.S. Provisional Application Ser. No. 62/237,891, filed on Oct. 6, 2015.

The above-referenced application is hereby incorporated herein by reference in its entirety.

FIELD OF THE DISCLOSURE

Certain embodiments of the disclosure relate to electromagnetic components, integrated circuits, and/or wireless communication devices and systems. More specifically, certain embodiments of the disclosure relate to a method and system for reflection-based radio frequency (RF) multiplexers.

BACKGROUND OF THE DISCLOSURE

In communications, in order to correctly receive a desired signal, the desired signal is separated from many other signals that are present on the same medium. This is applicable to wired communication systems and/or wireless communication systems. In the case of wireless communication systems, for example, the task of separating the desired signal from other signals can be a substantial challenge since it might not be known what other signals are present in the air which may interfere with receive circuitry. Further, the transmitter may also interfere with the receive circuitry since the transmitter sits on the same system as the receive circuitry and may operate at the same or a very close frequency to that of the desired receive signal. There are many techniques to isolate a receiver from a transmitter.

As demand for higher bandwidths and better connectivity continues to grow, interest in carrier aggregation has increased. In carrier aggregation, a wireless device may receive the desired information at different frequency bands (or channels) and/or may transmit the information at different frequency bands (or channels).

The requirements for RF filters and multiplexers have become more stringent in light of new communication standards where information channels and frequency bands are closer to each other; new communication devices such as smartphones where the footprint and cost of all components must be very small as more components are needed in support of multiple standards and applications; and co-existing communication systems where multiple communication transmitters and receivers work simultaneously.

Linearity, noise, and power handling requirements might lead to utilization of passive RF filters and multiplexers in many applications. The performance of passive RF filters may be limited by the quality factor (Q) of the components that are used in their realization. The filter selectivity as well as passband requirement may lead to a filter topology and filter order. For a given RF filter topology and order, insertion loss may reduce with the increase of component Q.

Various technologies can be used to realize passive RF filters and duplexers. For instance, capacitors, inductors, or transmission lines can be used to realize passive RF filters and duplexers. Electromagnetic resonators, including waveguide, air cavity, dielectric, and ceramic resonators, can also be used to realize passive filters and duplexers. The quality factor of such components is proportional to their overall physical size. As such, it has been difficult to realize compact low-loss selective passive RF filters and duplexers using electromagnetic components and resonators.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

A system and/or method for reflection-based radio frequency (RF) multiplexers, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

DETAILED DESCRIPTION OF THE DISCLOSURE

Figure 1:
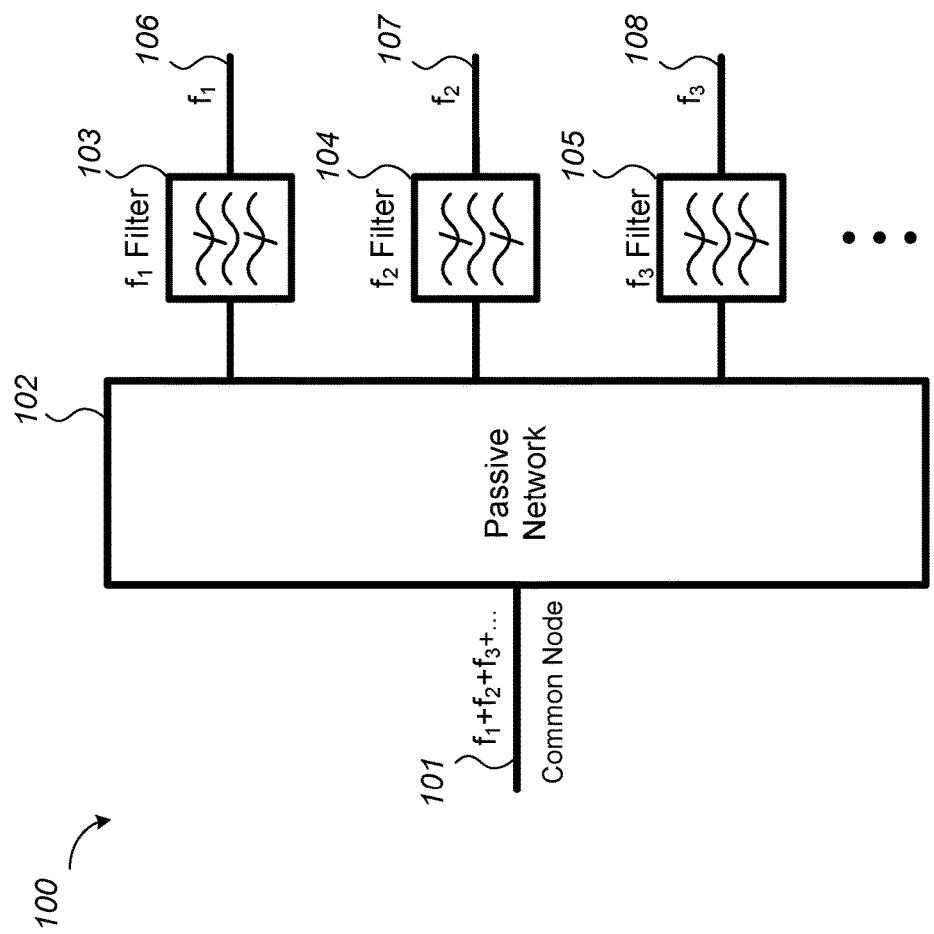
FIG. 1 illustrates an embodiment of an RF multiplexer according to the present disclosure.

As utilized herein the terms "circuit" and "circuitry" refer to physical electronic components (i.e. hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated.

In some embodiments of the present disclosure, a component that separates different frequency bands is called a multiplexer. An RF multiplexer, in its simplest form, is a 1×N passive network including 1 nominal input and N nominal output ports (N is a positive integer) where each output corresponds to a specific frequency band. In other words, the transfer function from the input to each of the N outputs resembles a filter tuned to a specific frequency band. Furthermore, it is often desirable that the output ports of the multiplexer are isolated. In other words, the transfer functions from each of the output ports to every other output port should have a small magnitude at the frequency bands corresponding to those two ports.

Some embodiments of the present disclosure provide 1×N RF multiplexers that include RF band-pass filters (BPF) with distinct passband frequencies that are connected to a common port using a passive network or a number of passive networks. The passive network or networks can ensure proper impedance at all frequency bands of interest and may assist in enhancing the frequency response.

In some embodiments of the present disclosure, an input port of an RF multiplexer may correspond to an antenna interface and the output ports may correspond to receive or transmit frequency bands.

In some embodiments of the present disclosure, a duplexer may be considered a multiplexer with N=2. In other words, a duplexer is a three-port device. In an exemplary example, a duplexer can be configured to achieve good isolation between the transmitter and the receiver by using a pair of quadrature hybrid couplers (QHC) along with filters for the desirable bands. A duplexer can be used, for example, in wireless communication systems supporting frequency division duplexing (FDD).

In some embodiments of the present disclosure, piezoelectric material can be used to realize compact high-Q resonators. Surface acoustic wave (SAW) resonators can provide compact low-loss selective RF filters and duplexers. Further, bulk acoustic wave (BAW) resonators can be used to construct high-performance RF filters and duplexers. Micro-electro-mechanical system (MEMS) resonators with high quality factor can also be used in filtering applications.

In some embodiments of the present disclosure, RF SAW filters and duplexers can be used in wireless communications such as cellular phones, wireless local area network (WLAN) transceivers, global positioning system (GPS) receivers, cordless phones, and so forth. RF SAW filters have been used as band-select filters, image-reject filters, intermediate frequency (IF) filters, transmitter noise or spur reduction filters, and so forth. A smartphone may have several SAW resonators, SAW filters, and SAW multiplexers to support various communication systems and standards.

Some embodiments of the present disclosure provide resonators (e.g., BAW resonators) that have lower loss (or higher Q) or are more compact, especially at higher frequencies, compared with SAW resonators, for example. Therefore, RF filters and duplexers that use BAW resonators can have lower insertion loss, or higher selectivity, or smaller form factor compared with those that utilize SAW resonators, especially at higher frequencies. Thin film bulk acoustic resonators (FBAR) and bulk acoustic wave solidly mounted resonator (BAW SMR) are exemplary examples of BAW resonators.

In commercial systems, some embodiments of the present disclosure contemplate that the choice of technology may depend on the technical performance, such as power consumption as well as economic and business considerations such as cost, size, and time to market. For instance, while one technology may offer a better performance compared with another technology, it might not be adopted for a commercial system that is cost sensitive. In the case of RF filters and duplexers, it may be desirable to use a technology that leads to the lower cost and/or more compact solution, as long as a predetermined performance criterion is met. In other words, a more expensive or larger solution may not be adopted, even if it offers better performance as compared with an alternative solution that meets an acceptable performance level at a lower cost and/or size. For instance, while RF filters and multiplexers that use BAW resonators may offer lower loss compared with RF filters and multiplexers that use SAW resonators for a given set of specifications, the higher relative cost of BAW technology, as well as its relatively smaller number of suppliers, might disfavor their usage in certain applications and standards. Other considerations may include, for example, the ease of integration with the rest of the components in a communication system. For instance, there may be performance, business, or economic advantages for integrating RF filters and multiplexers with low noise amplifiers (LNAs), power amplifiers (PAs), transmit/receive (T/R) or band-select switches, impedance matching networks, etc. A wireless communication device, such as a smartphone, can include a number of SAW filters and multiplexers as well as a number of BAW filters and duplexers. Each SAW filter or BAW filter or duplexer may be used for a specific communication application, standard, or frequency band.

Some embodiments of the present disclosure provide architectural solutions that enable realization of highly-selective, low-loss multiplexers with high-isolation between the ports. Some embodiments of the present disclosure use a lower cost or more compact technology within an innovative architecture that satisfies a comparable or better specification compared to what can be achieved using a more expensive or less compact technology. Exemplary embodiments might include replacing BAW multiplexers with SAW multiplexers using an innovative architecture, or replacing ceramic or cavity multiplexers with BAW multiplexers using an innovative architecture.

Some embodiments of the present disclosure provide architectural solutions that enable realization of tunable, reconfigurable, and/or programmable RF multiplexers that can satisfy the requirements of multi-standard communication systems.

Some embodiments of the present disclosure provide reflection-type filters that can use an elegant method to produce desired filter responses using filters and quadrature hybrid couplers (QHCs), such as disclosed in U.S. Pat. Nos. 4,694,266, 5,781,084, 8,013,690, and 8,749,321, which are hereby incorporated herein by reference in their entirety. In an exemplary example, high quality band-stop filters (BSF) can be implemented using a low-loss quadrature hybrid and a low-loss selective band-pass filters (BPF) realized with high-quality-factor SAW resonators.

In wireless communication, it is often desirable to receive and transmit, or operate at two frequency bands, at the same time using one antenna. To accomplish this, some embodiments provide that circuitry is used to send most of the incoming signal from the antenna to the receiver, and send most of the outgoing signal from the transmitter to the antenna, while maintaining high isolation between the transmit and receive paths. Two circuitry options include circulators and/or duplexers.

Some embodiments provide for receiving and transmitting simultaneously over more than two frequency bands. Just like the case for two frequency bands, it is desirable to have low insertion loss from and to the antenna for each frequency band while maintaining high isolation between frequency bands.

Some embodiments provide a novel multiplexer for three or more frequency bands that are used concurrently. Some embodiments provide that QHCs and filters are used to separate multiple frequencies. An advantage of some embodiments is that some embodiments are modular and scalable in the number of frequency bands. Accordingly, more frequency bands can be supported without significant degradation in performance. Another advantage of some embodiments is that some embodiments enable low-cost compact multiplexers for commercial wireless communication systems in support of carrier aggregation, multi-standard, multi-band, and multi-mode operation. Yet another advantage of some embodiments is that some embodiments enable low-cost compact tunable frequency multiplexers that meet the requirements of commercial wireless communication standards. Another advantage of some embodiments is that some embodiments relax the requirements for filters and associated components in a multiplexer.

FIG. 1 illustrates an exemplary realization of an RF multiplexer 100 including filters 103, 104, 105, . . . specific to the desired frequency bands $f_1$, $f_2$, $f_3$, . . . that are coupled to a common node 101 through a passive network 102. The passive network 102 provides proper impedance matching at the desired frequencies to the common node 101. It may also provide additional filtering and port-to-port isolation. In order to satisfy the stringent port-to-port isolation requirement in the RF multiplexer 100, filters 103, 104, 105, . . . are typically extremely selective. These filters are high-order filters; they have several poles and zeros in their transfer functions to ensure high selectivity. To maintain a low insertion loss, these selective filters use high quality factor components in their realizations. Filter technologies that offer high quality factor components can be expensive or can have a large footprint. Tunable RF multiplexers are desirable in support of multi-band, multi-standard, software-defined, and cognitive wireless schemes. In the realization of FIG. 1, RF filters 103, 104, 105, . . . may be tunable. Unfortunately, typical tunable components might not have the high quality factors that are required to keep the insertion loss below acceptable levels in highly selective filters. It is therefore desirable that some embodiments enable realizations of tunable RF multiplexers with low cost technologies (e.g., commercially available low cost technologies).

Figure 2:
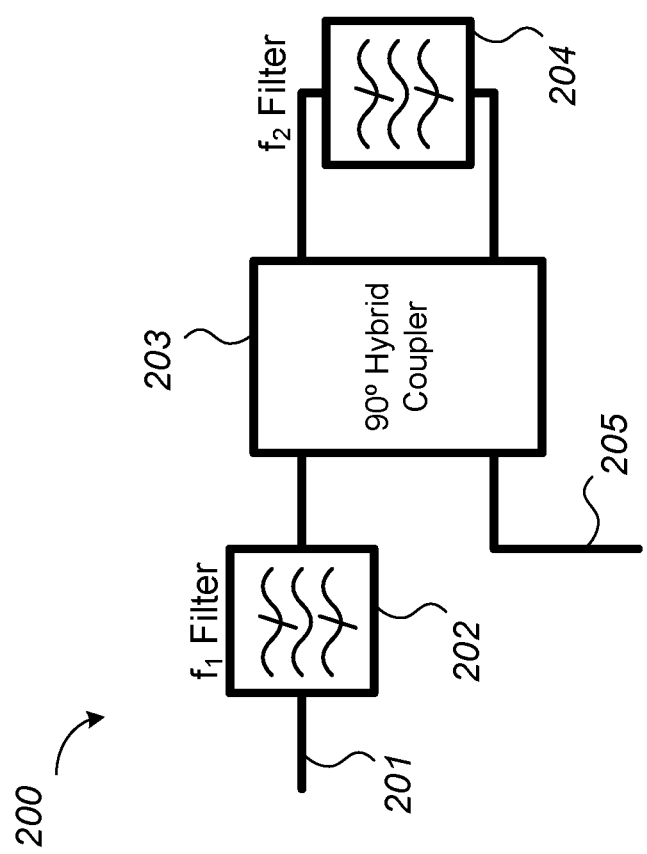
FIG. 2 illustrates an embodiment of a reflection-type filter according to the present disclosure.

FIG. 2 illustrates an exemplary realization of a reflection-type filter 200. The signal entering through node 201 passes through a band-pass filter 202 with a nominal passband frequency $f_1$ ($f_1$ band-pass filter 202). The filtered signal then enters a QHC 203 and is then split into two signals that differ by 90 degrees in phase from each other. A portion of the signal in frequency band $f_1$ reflects off of an $f_2$ band-pass filter 204 which causes its polarity to invert, re-enter the QHC 203, recombine constructively, and exit at node 205. A portion of the split signal that is within another frequency band $f_2$ passes through the $f_2$ band-pass filter 204 and re-enters the QHC 203 in the opposite nodes it entered the $f_2$ band-pass filter 204 and combines constructively to exit to top left node to $f_1$ band-pass filter 202. Because the portion of the signal that is centered at frequency band $f_2$ is not sent to the node 205, the circuitry 200 is effectively further filtering the $f_2$ portion of the signal. In other words, the combination of the QHC 203 and the $f_2$ band-pass filter 204 creates a band-stop filter at frequency band $f_2$. The entire structure 200 including the $f_1$ band-pass filter 201, the QHC 203, and the $f_2$ band-pass filter 204 provides band-pass filtering at frequency band $f_1$ and band-stop filtering at frequency band $f_2$. For instance, the $f_1$ band-pass filter 202 may be tuned to a frequency band of interest while the $f_2$ band-pass filter 204 may be tuned to a frequency band where there is an undesired signal (blocker, jammer, self-interference, etc.). The stopband provided by the QHC 203 and the $f_2$ band-pass filter 204 may reduce the selectivity requirement of $f_1$ band-pass filter 202. Specifically, the filter order, hence the insertion loss, of $f_1$ band-pass filter 202 may be reduced for the same filter technology and component quality factors.

Figure 3:
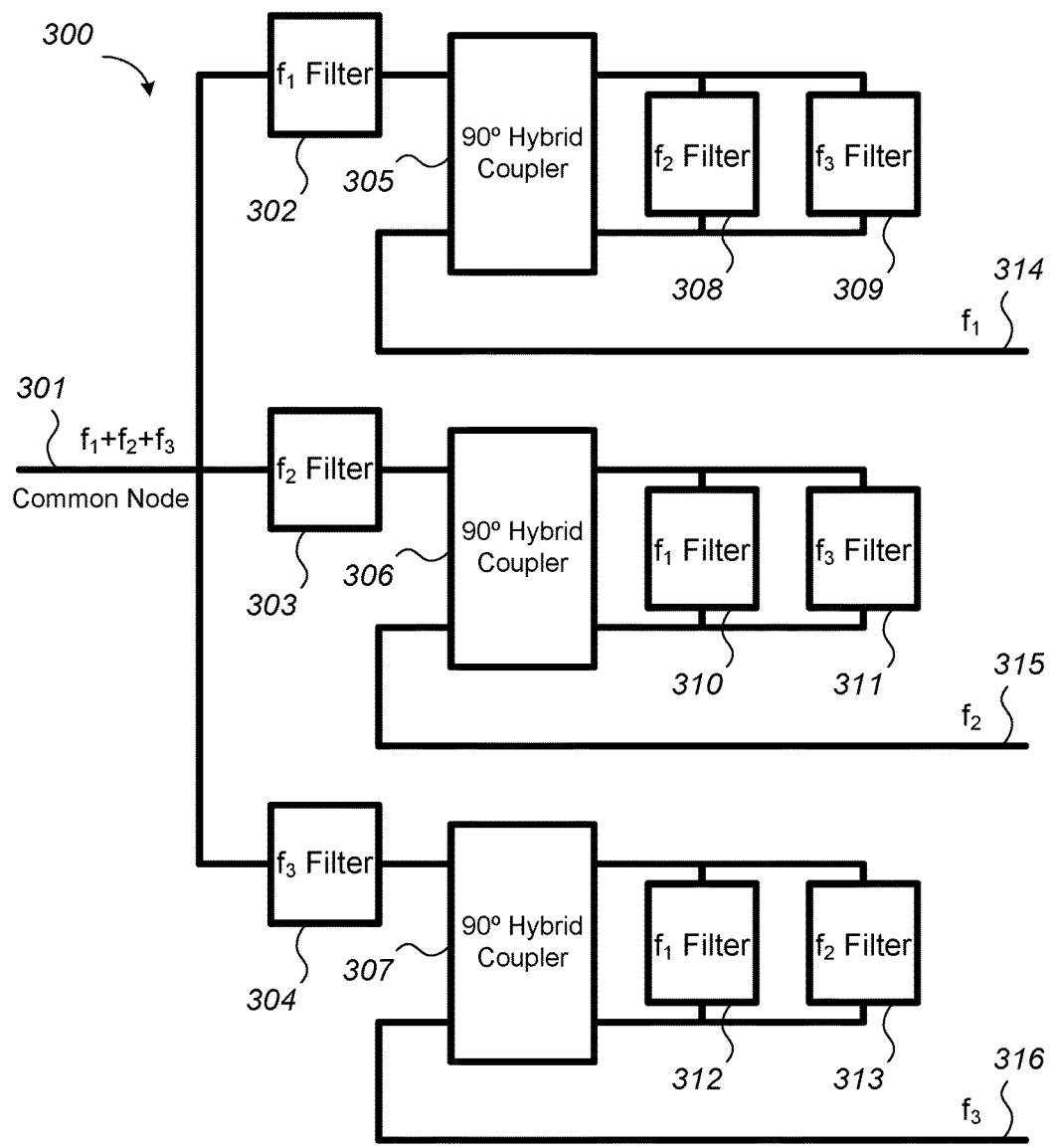
FIG. 3 illustrates an embodiment of a multiplexer that supports three frequency bands according to the present disclosure.

FIG. 3 illustrates an embodiment of a multiplexer according to the present disclosure. This scheme is a multiplexer 300 in support of three frequency bands, $f_1$, $f_2$, and $f_3$; as such, it may also be referred to as a triplexer. The triplexer 300 includes three parallel branches that share a common node 301. Each branch provides band-pass filtering at one desired frequency band while it provides band-stop filtering at the other two desired frequency bands. For instance, including an $f_1$ band-pass filter 302, a QHC 305, and a parallel connection (e.g., a parallel electrical circuit arrangement) of an $f_2$ band-pass filter 308 and an $f_3$ band-pass filters 309, an exemplary top branch of the triplexer 300 offers band-pass filtering at frequency band $f_1$ and band-stop filtering at frequency band $f_2$ and frequency band $f_3$ between the common node 301 and an $f_1$ node 314. In comparison to the RF multiplexer of FIG. 1, this scheme offers higher port-to-port isolation at all the desired frequency bands because of the creation of stopbands. Therefore, the selectivity requirements of $f_1$, $f_2$, and $f_3$ filters are relaxed. For instance, these filters now can be realized as low-order filters with fewer components resulting in a lower insertion loss, a smaller footprint, and a lower cost. One or more of these filters may be tunable resulting in a tunable RF multiplexer. The filters in FIG. 3 are shown as band-pass filters, but can also be other types of filters such as low-pass or high-pass. As long as the filter passes the desired frequency band, it can be used. These filters need not be limited to a single passband. In each parallel branch, the number and specification of the parallel filters resulting in a band-stop response (e.g., filters 308 and 309 in the top path) may depend on the port-to-port isolation requirement and other factors. Different parallel paths need not have the same number of such filters. The type and order of the $f_1$ filter, $f_2$ filter, and $f_3$ filter need not be the same, and can depend on the specifications of the triplexer. Furthermore, $f_1$ filters 302, 310, and 312 need not be the same. Likewise, $f_2$ filters 303, 308, 313 need not be same; $f_3$ filters 304, 309, and 311 need not be the same either. QHCs 305, 306, and 307 need not be identical; each QHC may be designed in conjunction with the filters that connect to it for a desired performance.

In an exemplary passive filter, the input reflection coefficient ($S_{11}$) and the input-output transfer function ($S_{21}$) are related. For instance, within the passband of a passive filter where $S_{21}$ is ideally close to 1, the input reflection coefficient $S_{11}$ is ideally close to zero. In other words, the filter is impedance matched at the input at its passband. Likewise, within the stopbands of a passive filter where $S_{21}$ is ideally close to zero, the input reflection coefficient is close to one. In other words, the filter reflects the signals at its input outside of its passband (within its stopband). Given that filters 302, 303, and 304 nominally have non-overlapping passbands, their inputs can be tied to each other at a common node 301 without undesired loading effects. For instance, at frequency band $f_1$, only the input impedance of $f_1$ filter 302 is impedance matched while the inputs of $f_2$ filter 303 and $f_3$ filter 304 act as reflectors. This ensures that the power of the input signal at frequency band $f_1$ is primarily delivered to the first (top) branch. As discussed before, the residual signal power at frequency band $f_1$ that enters the other two branches due to the $f_1$ filter 302 imperfections (e.g., due to realization of a low order or tunable filter) can be further attenuated by the band-stop filters formed by the combination of QHC 306 and $f_1$ filter 310 before reaching output 315, and by the combination of QHC 307 and $f_1$ filter 312 before reaching output 316. Passive components may be added to the common node 301 to improve the input impedance matching at the frequency bands of interest. In fact, in practice, some embodiments contemplate the co-design of the filters 302, 303, and 304, along with possible additional input impedance matching circuitry, to ensure an optimal response.

Figure 4:
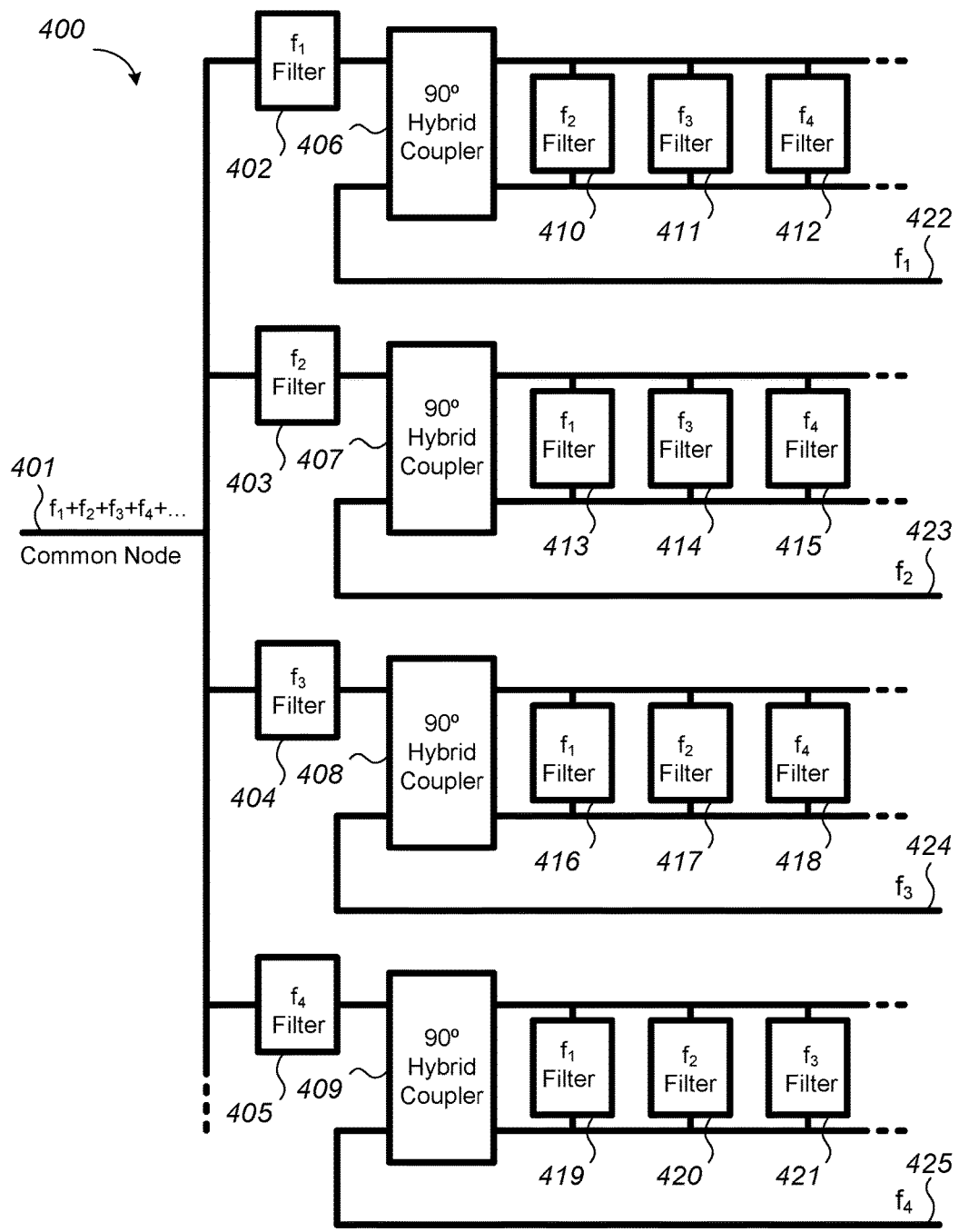
FIG. 4 illustrates an embodiment of a multiplexer that supports four or more frequency bands according to the present disclosure.

FIG. 4 illustrates an embodiment of a multiplexer according to the present disclosure. This scheme is a multiplexer 400 in support of four or more frequency bands, $f_1, f_2, f_3, f_4$. The RF multiplexer 400 includes four or more parallel branches that share a common node 401. Each branch provides band-pass filtering at one desired frequency band while it provides band-stop filtering at the other desired frequency bands. For instance, including an $f_1$ band-pass filter 402, a QHC 406, and a parallel connection of an $f_2$ band-pass filter 410, an $f_3$ band-pass filter 411, an $f_4$ band-pass filter 412 . . . , an exemplary top branch of the multiplexer 400 offers band-pass filtering at $f_1$ and band-stop filtering at $f_2, f_3, f_4$ . . . , between the common node 401 and an $f_1$ node 422. In comparison to the RF multiplexer 100 of FIG. 1, this scheme offers higher port-to-port isolation at all the desired frequency bands because of the creation of stopbands. Therefore, the selectivity requirements of $f_1, f_2, f_3, f_4$ . . . filters are relaxed. For instance, these filters now can be realized as low-order filters with fewer components resulting in a lower insertion loss, a smaller footprint, and a lower cost. One or more of these filters may be tunable resulting in a tunable RF multiplexer. The filters in FIG. 4 are shown as band-pass filters, but can also be other types of filters such as low-pass or high-pass. As long as the filter passes the desired frequency band, it can be used. These filters need not be limited to a single passband. In each parallel branch, the number and specification of the parallel filters resulting in a band-stop response (e.g., filters 410, 411, 412 . . . in the top path) may depend on the port-to-port isolation requirement and other factors. Different parallel paths need not have the same number of such filters. The type and order of the $f_1$ filter, $f_2$ filter, $f_3$ filter, $f_4$ filter . . . need not be the same, and can depend on the specifications of the multiplexer. Furthermore, $f_1$ filters 402, 413, 416, 419, . . . need not be the same. Likewise, $f_2$ filters 403, 410, 417, 420, . . . need not be same; $f_3$ filters 404, 411, 414, 421, . . . need not be the same; $f_4$ filters 405, 412, 415, 418, . . . need not be the same. QHCs 306, 307, 308, 309, . . . need not be identical; each QHC may be designed in conjunction with the filters that connect to it for a desired performance. The previous discussions about input impedance matching at the common node 301 in FIG. 3 apply similarly to the input impedance matching at common node 401 in FIG. 4.

Figure 5:
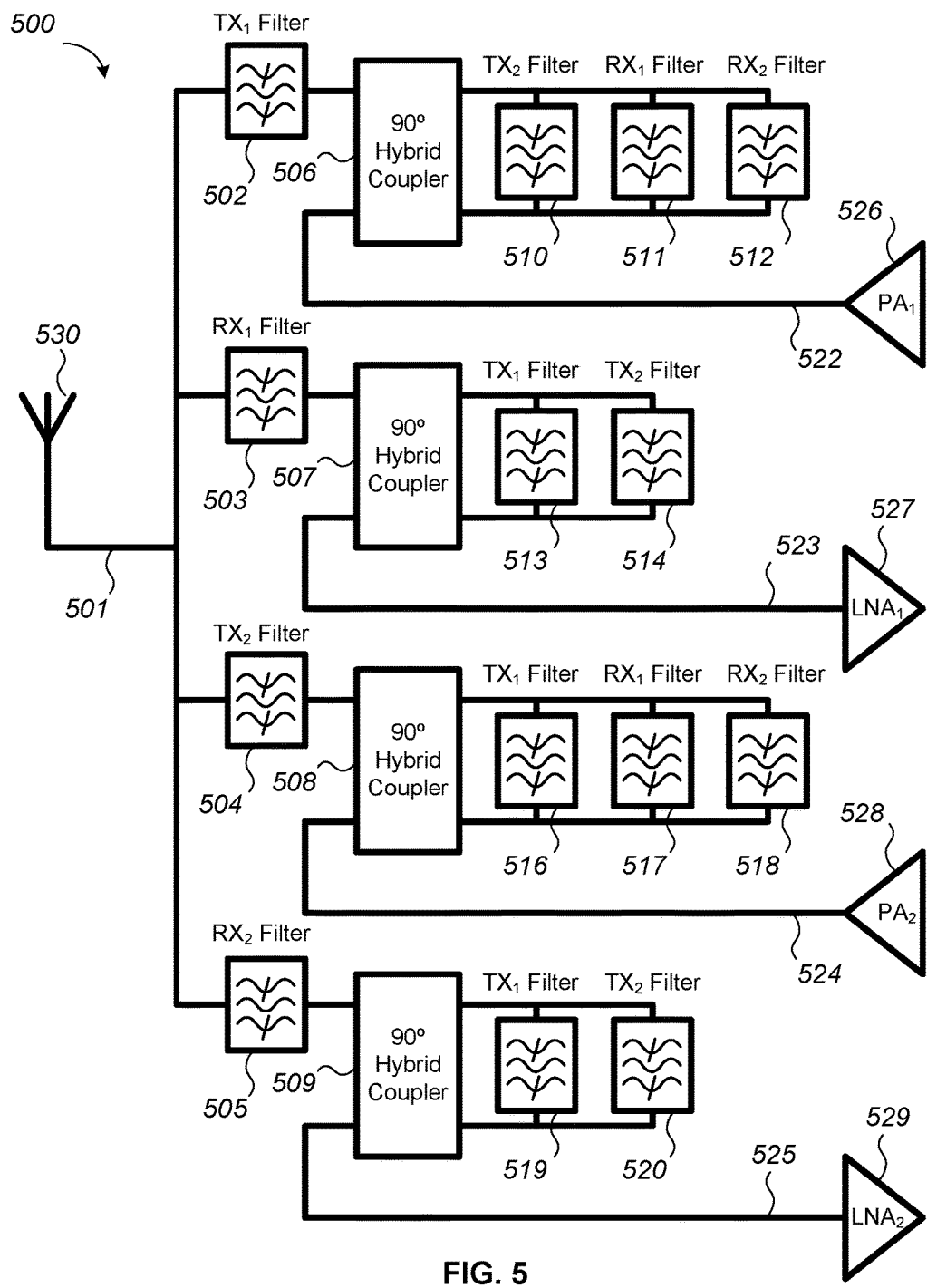
FIG. 5 illustrates an application for an example multiplexer that supports four frequency bands in the front end of a wireless communication system according to the present disclosure.

FIG. 5 illustrates an example application for an exemplary RF multiplexer 500 in a front end of a wireless communication system that supports two transmit and two receive frequency bands. In this example, the common node 501 is coupled to an antenna 530. There might be additional components provided to improve impedance matching at the common node 501. Branches 522 and 524 correspond to transmit frequency bands and are coupled to transmitting power amplifiers (PA) 526 and 528, respectively, representing two transmit paths. In some embodiments, both branches 522 and 524, corresponding to transmit frequency bands, may be coupled to the same transmitting power amplifier. Branches 523 and 525 correspond to receive frequency bands and are coupled to receiving low noise amplifiers (LNA) 527 and 529, respectively, representing two receive paths. In some embodiments, both branches 523 and 525, corresponding to receive frequency bands, may be coupled to the same receiving low noise amplifier. As discussed before and explicitly shown in FIG. 5, not all filters are necessary in an application. For instance, in this exemplary example, since isolation from transmit signal is advantageous in most wireless systems, every branch may include the transmit filters in the reflection section (filters 510, 513, 514, 516, 519, 520). However, in this exemplary example, there is no need to further reject the other receive band in the receive branches. As such, the reflection sections of the receive paths include TX filters and do not include RX filters.

Figure 6:
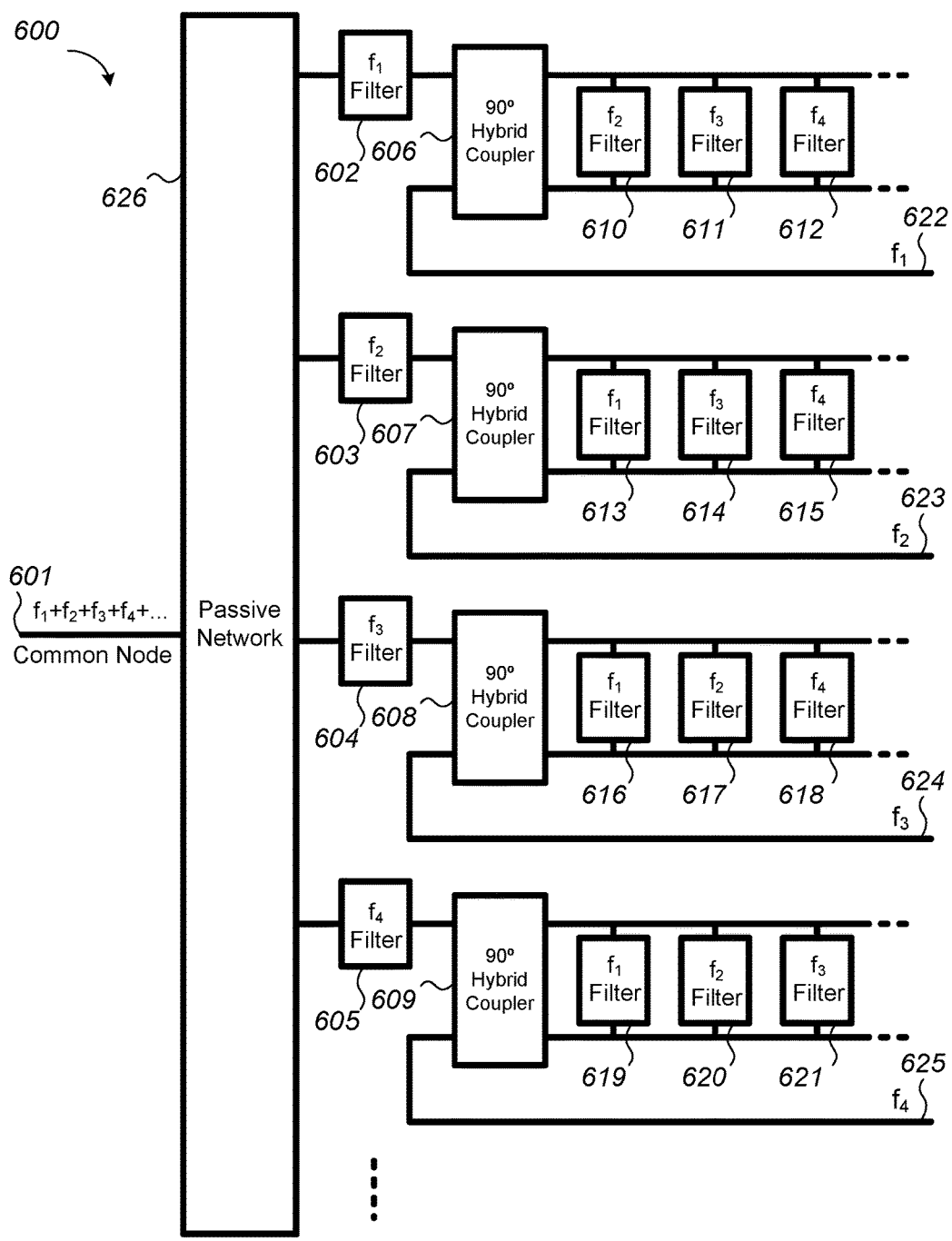
FIG. 6 illustrates an embodiment of multiplexer that supports four or more frequency bands according to the present disclosure.

FIG. 6 illustrates an embodiment of a multiplexer according to the present disclosure. This scheme is a multiplexer 600 in support of four or more frequency bands, $f_1, f_2, f_3, f_4$ . . . The RF multiplexer 600 includes four or more parallel branches that are coupled to a common node 601 through a passive network 626. The passive network 626 may provide proper impedance matching and additional filtering. Each of the parallel branches provides band-pass filtering at one desired frequency band while providing band-stop filtering at the other desired frequency bands. For instance, including an $f_1$ band-pass filter 602, a QHC 606, and a parallel connection of an $f_2$ band-pass filter 610, an $f_3$ band-pass filter 611, an $f_4$ band-pass filter 612 . . . , the top branch of the multiplexer 600 provides band-pass filtering at frequency band $f_1$ and band-stop filtering at frequency bands $f_2, f_3, f_4$ . . . between the common node 601 and an $f_1$ node 622. In comparison to the RF multiplexer 100 of FIG. 1, this scheme provides higher port-to-port isolation at all the desired frequency bands because of the creation of stopbands. Therefore, the selectivity requirements of $f_1, f_2, f_3, f_4$ . . . filters are relaxed. For instance, these filters now can be realized as low-order filters with fewer components resulting in a lower insertion loss, a smaller footprint, and a lower cost. One or more of these filters may be tunable resulting in a tunable RF multiplexer. The filters in FIG. 6 are shown as band-pass filters, but could be other types of filters such as low-pass or high-pass. As long as the filter passes the desired frequency band, it can be used. These filters need not be limited to a single passband. In each parallel branch, the number and specification of the parallel filters resulting in a band-stop response (e.g., filters 610, 611, 612 . . . in the top path) may depend on the port-to-port isolation requirement and other factors. Different parallel paths need not have the same number of such filters. The type and order of the $f_1$ filter, $f_2$ filter, $f_3$ filter, $f_4$ filter . . . need not be the same, and can depend on the specifications of the multiplexer. Furthermore, $f_1$ filters 602, 613, 616, 619, . . . need not be the same. Likewise, $f_2$ filters 603, 610, 617, 620, . . . need not be same; $f_3$ filters 604, 611, 614, 621, . . . need not be the same; $f_4$ filters 605, 612, 615, 618, . . . need not be the same, . . . . QHCs 606, 607, 608, 609, . . . need not be identical; each QHC may be designed in conjunction with the filters that connect to it for a desired performance.

Figure 7:
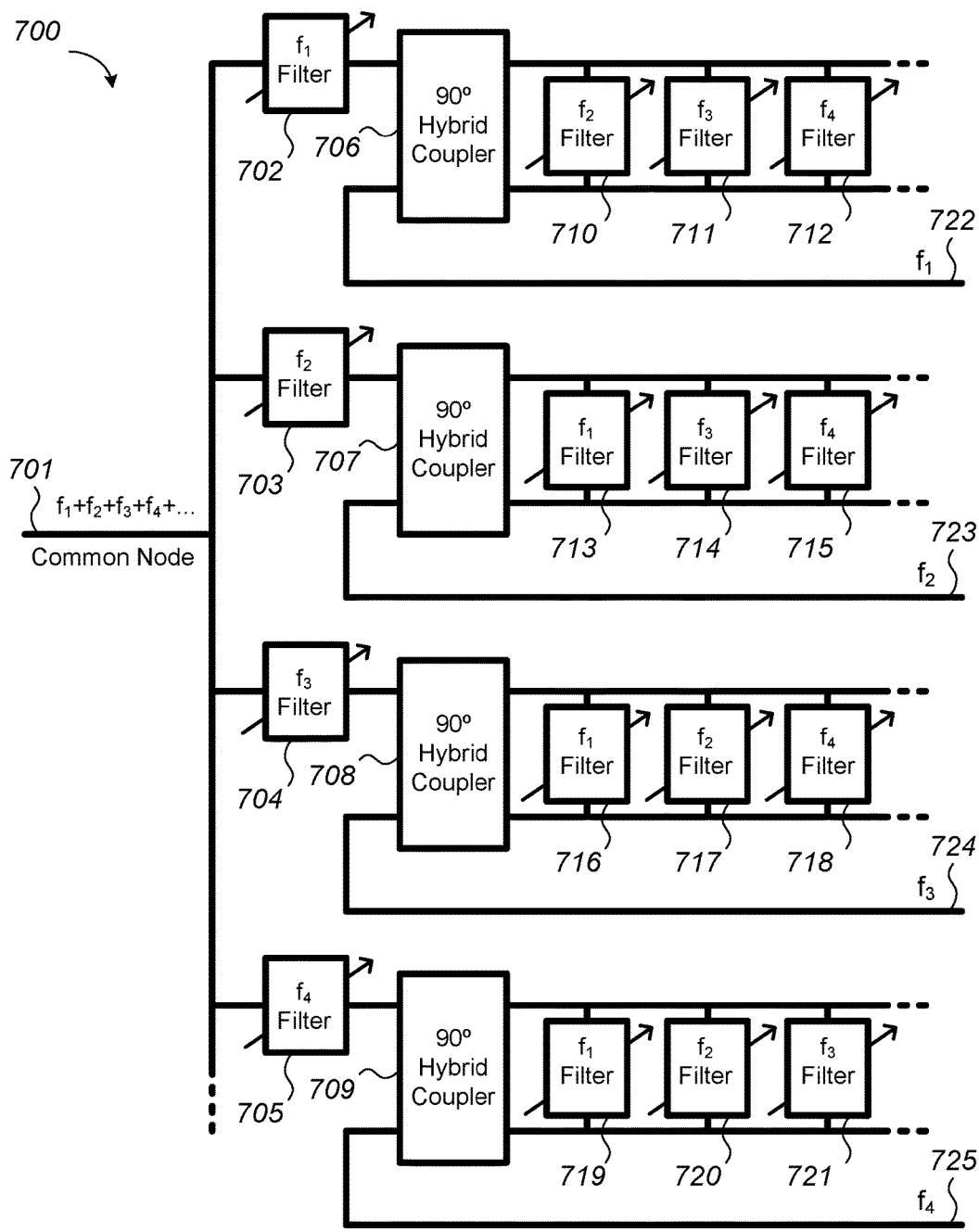
FIG. 7 illustrates an embodiment of a tunable multiplexer that supports four or more frequency bands according to the present disclosure.

FIG. 7 illustrates an embodiment of a multiplexer according to the present disclosure. This scheme is a tunable multiplexer 700 in support of four or more frequency bands, $f_1, f_2, f_3, f_4$ . . . The tunable RF multiplexer 700 includes four or more parallel branches that share a common node 701. Each branch provides tunable band-pass filtering at one desired frequency band while providing tunable band-stop filtering at the other desired frequency bands. For instance, including a tunable $f_1$ band-pass filter 702, a QHC 706, and a parallel connection of a tunable $f_2$ band-pass filter 710, a tunable $f_3$ band-pass filter 711, a tunable $f_4$ band-pass filter 712 . . . , the top branch of the multiplexer 700 provides tunable band-pass filtering at frequency band $f_1$ and tunable band-stop filtering at frequency bands $f_2, f_3, f_4$ . . . between the common node 701 and an $f_1$ node 722. In comparison to the RF multiplexer 100 of FIG. 1, this scheme offers higher port-to-port isolation at all the desired frequency bands because of the creation of stopbands. Therefore, the selectivity requirements of $f_1, f_2, f_3, f_4$ . . . filters are relaxed. For instance, these filters now can be realized as low-order filters with fewer components resulting in a lower insertion loss, a smaller footprint, and a lower cost. The filters in FIG. 7 are shown as band-pass filters, but could be other types of filters such as low-pass or high-pass. As long as the filter passes the desired frequency band, it can be used. These filters need not be limited to a single passband. In each parallel branch, the number and specification of the parallel filters resulting in a band-stop response (e.g., filters 710, 711, 712 . . . in the top path) may depend on the port-to-port isolation requirement and other factors. Different parallel paths need not have the same number of such filters. The type and order of the $f_1$ filter, $f_2$ filter, $f_3$ filter, $f_4$ filter . . . need not be the same, and can depend on the specifications of the multiplexer. Furthermore, $f_1$ filters 702, 713, 716, 719, . . . need not be the same. Likewise, $f_2$ filters 703, 710, 717, 720, . . . need not be same; $f_3$ filters 704, 711, 714, 721, . . . need not be the same; $f_4$ filters 705, 712, 715, 718, . . . need not be the same, . . . . QHCs 706, 707, 708, 709, . . . need not be identical; each QHC may be designed in conjunction with the filters that connect to it for a desired performance. While not explicitly shown, any or all of the QHCs may also be tunable. A passive network, fixed or tunable, may also be provided in a similar manner as shown in FIG. 6 to improve impedance matching or provide additional filtering.

Figure 8:
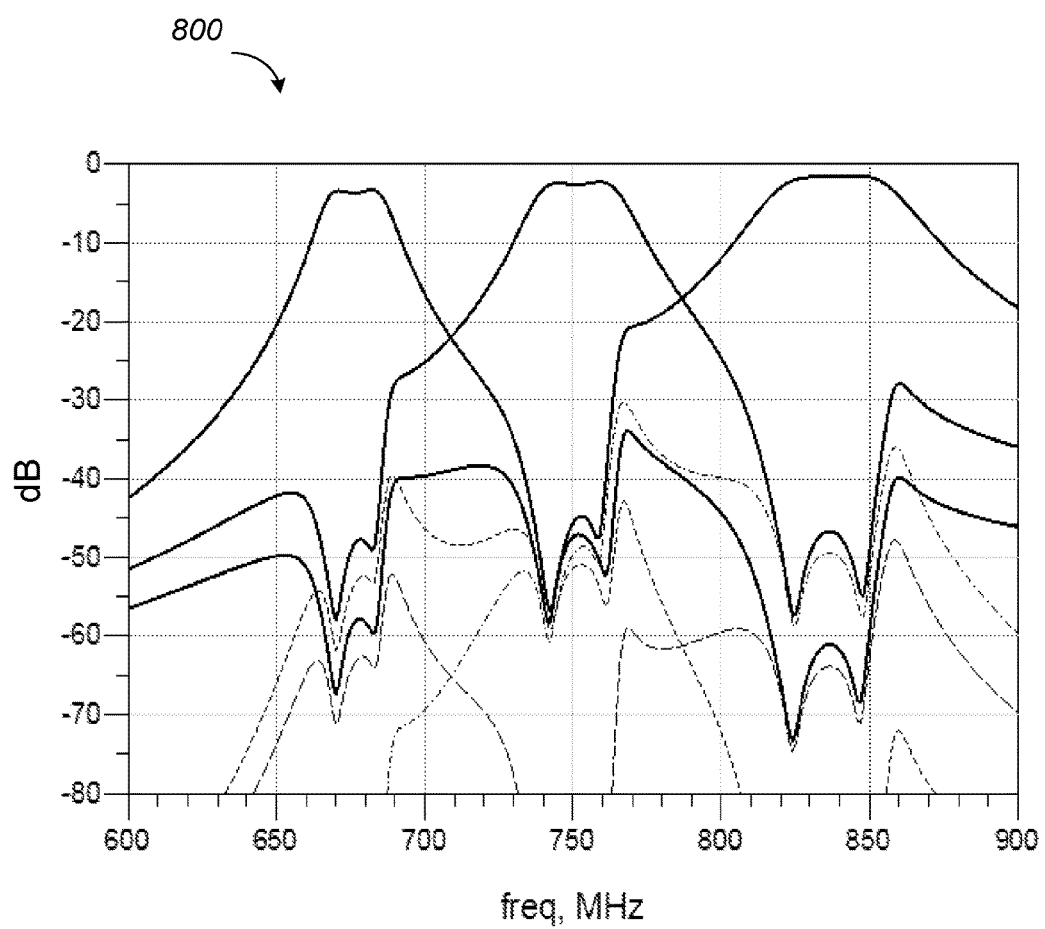
FIG. 8 is a graph showing the frequency response of an example RF multiplexer according to the present disclosure.

FIG. 8 illustrates an example graph showing the frequency response of an embodiment of an RF multiplexer that supports three frequency bands. The graph 800 shows the S-parameters of the multiplexer. The solid lines are the signal transfer functions between the common port and every single band ports (e.g., transfer function between node 301 and nodes 314, 315, and 316 in FIG. 3). Each transfer function has a passband at one frequency band and a large attenuation (stopband) at the other two frequency bands. The dotted and dashed lines are the transfer function between every single band ports (e.g., transfer function between pairs of nodes 314, 315, and 316 in FIG. 3). Low insertion loss (in the passband) and high port-to-port isolation in the exemplary RF multiplexer are some of the architectural advantages of the present disclosure.

Some embodiments of the RF multiplexer according to the present disclosure may be used or included in hand-held portable or mobile devices supporting wireless communications such as a cell phone, a smartphone, a tablet, a laptop, a smartwatch, etc.

Some embodiments of the RF multiplexer according to the present disclosure may be used or included in devices supporting the wireless communication infrastructure such as base stations (e.g., macro-, micro-, pico-, and femto-base stations), repeaters, etc.

Some embodiments of the RF multiplexer, according to the present disclosure, enable compact multiband, multi-standard wireless communication devices, wireless communication devices that support carrier aggregation, and wireless communication devices that support frequency division duplexing.

Some embodiments of the RF multiplexer according to the present disclosure may be used or included in a multi-antenna communication system.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for reflection-based RF multiplexers.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A radio frequency multiplexer supporting a plurality of frequency bands, comprising:
   a common node;
   a plurality of single band nodes;
   a plurality of parallel branches, wherein each parallel branch is dedicated to one of the plurality of frequency bands, wherein each parallel branch connects the common node and one of the plurality of single band nodes, and wherein a particular branch of the parallel branches comprises:
      a filter configured to pass a desired frequency band through the particular branch;
      a quadrature hybrid coupler coupled to the filter; and
      a set of one or more other filters corresponding to one or more other frequency bands of the plurality of frequency bands, wherein the set of one or more other filters and the quadrature hybrid coupler are coupled and configured to reject the one or more other frequency bands by the particular branch.

2. The radio frequency multiplexer of claim 1, comprising a passive network coupled to the common node and configured to further improve impedance matching.

3. The radio frequency multiplexer of claim 1, wherein the radio frequency multiplexer comprises a triplexer.

4. The radio frequency multiplexer of claim 1, wherein the filter and the one or more other filters comprise one or more band-pass filters.

5. The radio frequency multiplexer of claim 1, wherein one or more of the filter and the one or more other filters comprise one or more low-pass filters.

6. The radio frequency multiplexer of claim 1, wherein one or more of the filter and the one or more other filters comprise one or more high-pass filters.

7. The radio frequency multiplexer of claim 1, wherein one or more of the filter and the one or more other filters are tunable or reconfigurable.

8. The radio frequency multiplexer of claim 1, wherein one or more of the quadrature hybrid couplers are tunable or reconfigurable.

9. The radio frequency multiplexer of claim 1, wherein one or more of the filter and the one or more other filters comprise one or more surface acoustic wave (SAW) filters.

10. The radio frequency multiplexer of claim 1, wherein one or more of the filter and the one or more other filters comprise one or more bulk acoustic wave (BAW) filters.

11. The radio frequency multiplexer of claim 1, wherein the radio frequency multiplexer is included in a front end of a wireless communication system that supports carrier aggregation.

12. The radio frequency multiplexer of claim 1, wherein the radio frequency multiplexer is included in a front end of a wireless communication system that supports frequency division duplexing.

13. The radio frequency multiplexer of claim 1, wherein the radio frequency multiplexer is included in a front end of a multiband communication system.

14. The radio frequency multiplexer of claim 1, wherein the radio frequency multiplexer is included in a hand-held portable device that supports wireless communication.

15. The radio frequency multiplexer of claim 1, wherein the radio frequency multiplexer is included in a base station that supports a wireless communication infrastructure.

16. The radio frequency multiplexer of claim 1, wherein the radio frequency multiplexer is included in a repeater that supports a wireless communication infrastructure.

17. The radio frequency multiplexer of claim 1, wherein the particular branch is configured to correspond to a transmit frequency band.

18. The radio frequency multiplexer of claim 1, wherein one or more of the filter and the one or more other filters are realized in an acoustic domain.

19. The radio frequency multiplexer of claim 1, wherein the particular branch is configured to correspond to a receive frequency band.

20. The radio frequency multiplexer of claim 1, wherein the radio frequency multiplexer is included in a multi-antenna communication system.

* * * * *